оооо
US011057961B2

(12) United States Patent
Byun (10) Patent No.: US 11,057,961 B2
(45) Date of Patent: Jul. 6, 2021

(54) BASE STATION INTERFACE MODULE AND DISTRIBUTED ANTENNA SYSTEM HAVING THE SAME (71) Applicant: SOLiD, INC., Seongnam-si (KR)

(72) Inventor: Jong Dae Byun, Seoul (KR)

(73) Assignee: SOLiD, INC., Seongnam-si (KR)

(*) Notice: Subject to any disclaimer, the term of this patent is extended or adjusted under 35 U.S.C. 154(b) by 0 days.

(21) Appl. No.: 16/788,862

(22) Filed: Feb. 12, 2020

(65) Prior Publication Data
US 2021/0014936 A1 Jan. 14, 2021

(30) Foreign Application Priority Data

Jul. 8, 2019 (KR) .......................... 10-2019-0082030

(51) Int. Cl.
H04W 88/08 (2009.01)
H04W 92/04 (2009.01)
H04B 1/40 (2015.01)
H04B 1/403 (2015.01)

(52) U.S. Cl.
CPC ............ *H04W 88/085* (2013.01); *H04B 1/40* (2013.01); *H04B 1/406* (2013.01); *H04W 92/04* (2013.01)

(58) Field of Classification Search
CPC ...... H04W 88/085; H04W 92/04; H04B 1/40; H04B 1/406
See application file for complete search history.

(56) References Cited

U.S. PATENT DOCUMENTS 9,490,890 B2   11/2016  Cho
9,660,717 B2   5/2017   Han
9,825,690 B2   11/2017  Cho
9,948,379 B2*  4/2018   Cho .......................... H04B 7/04
10,374,687 B2  8/2019   Han
2012/0155884 A1* 6/2012 Han ................. H04B 10/25754
                                                   398/115
2012/0263425 A1* 10/2012 Kowalczyk .......... G02B 6/4471
                                                   385/135
2014/0341214 A1* 11/2014 Bolocan ............... H04Q 1/4575
                                                   370/352
2016/0285552 A1* 9/2016 You ........................ H04B 10/29
2017/0026106 A1  1/2017  Cho
(Continued)

FOREIGN PATENT DOCUMENTS

WO    2016108315 A1    7/2016

OTHER PUBLICATIONS

Communication dated Oct. 26, 2020, from the European Patent Office in application No. 20160385.9.

*Primary Examiner* — Dominic E Rego
(74) *Attorney, Agent, or Firm* — Sughrue Mion, PLLC (57) ABSTRACT A base station interface module included in a distributed antenna system includes: a separator configured to separate a base station signal input from a base station and output first and second base station signals; a pre-compensator configured to compensate for at least one of an amplitude and a phase of the first base station signal based on a preset compensation value; a first attenuator configured to attenuate the compensated first base station signal and to output the attenuated first base station signal to the distributed antenna system; and a second attenuator configured to attenuate the second base station signal and to terminate the attenuated second base station signal.

16 Claims, 5 Drawing Sheets (56) References Cited

U.S. PATENT DOCUMENTS

2017/0303016 A1* 10/2017 Barad ................. H04J 14/0213
2018/0302178 A1* 10/2018 Lloyd ................ H04B 17/0085
2019/0235003 A1*  8/2019 Paulsen ................ G01R 29/10
2019/0296782 A1*  9/2019 Naiki ................... H04B 1/1027

* cited by examiner

BASE STATION INTERFACE MODULE AND DISTRIBUTED ANTENNA SYSTEM HAVING THE SAME

CROSS-REFERENCE TO RELATED APPLICATION

This application claims the benefit of Korean Patent Application No. 10-2019-0082030, filed on Jul. 8, 2019 in the Korean Intellectual Property Office, the disclosures of which is incorporated herein in its entirety by reference.

BACKGROUND

1. Field

The disclosure relates to a base station interface module and a distributed antenna system having the same, and more particularly, to a base station interface module that matches base station signals for processing in a distributed antenna system and a distributed antenna system having the base station interface module.

2. Description of the Related Art

A distributed antenna system is a system for relaying communication between a base station and a user device. The distributed antenna system implements relaying by transmitting signals of multiple bands received from multiple base stations based on a downlink path to user devices in a service area and transmitting signals received from the user devices in the service area based on an uplink path to a base station.

In order for the distributed antenna system to implement the aforementioned relaying, it is necessary to match signals transmitted and received between a base station and the distributed antenna system. In particular, base station signals with high power levels are inadequate for processing in the distributed antenna system and cause passive inter-modulation distortion due to passive devices, and therefore need to lower power levels.

Accordingly, in the related art, the power level of a base station signal has been adjusted using a high power attenuator capable of handling high power or a winding-type attenuator in which a cable is wound several times.

However, a high power attenuator, a winding resistor type attenuator, etc. are expensive and have a large size, thereby increasing the manufacturing cost of the distributed antenna system and limiting the miniaturization of the distributed antenna system.

SUMMARY

Provided are a base station interface module capable of reducing the manufacturing cost of a distributed antenna system and enabling miniaturization while effectively preventing degradation in service performance due to passive inter-modulation distortion and a communication failure, and a distributed antenna system having the base station interface module.

The inventive concept of the present disclosure is not limited to the above objective(s), but other objective(s) not described herein may be clearly understood by one of ordinary skilled in the art from descriptions below.

According to an aspect of an embodiment, there is provided a base station interface module included in a distributed antenna system, the base station interface module includes: a separator configured to separate a base station signal input from a base station and output first and second base station signals; a pre-compensator configured to compensate for at least one of an amplitude and a phase of the first base station signal based on a preset compensation value; a first attenuator configured to attenuate the compensated first base station signal and to output the attenuated first base station signal to the distributed antenna system; and a second attenuator configured to attenuate the second base station signal and to terminate the attenuated second base station signal.

According to an exemplary embodiment, the preset compensation value may include an amplitude compensation value for compensating for an amplitude of the first base station signal such that an amplitude of a first passive inter-modulation distortion (PIMD) component generated in the first attenuator and introduced into an input terminal of the separator is equal to an amplitude of a second PIMD component generated in the second attenuator and introduced into the input terminal of the separator.

According to an exemplary embodiment, the preset compensation value may include an amplitude compensation value for compensating for the phase of the first base station signal such that a phase of a first PIMD component generated in the first attenuator and introduced into an input terminal of the separator is out of phase with the phase of a second PIMD component generated in the second attenuator and introduced into the input terminal of the separator.

According to an exemplary embodiment, the amplitude of the first base station signal may be less than an amplitude of the second base station signal.

According to an exemplary embodiment, the phase of the first station signal and a phase of the second base station signal may have a phase difference of 0°, 90°, or 180°.

According to an exemplary embodiment, the separator may be a coupler or a divider.

According to an exemplary embodiment, the pre-compensator may include an attenuator or an amplifier.

According to an exemplary embodiment, the pre-compensator may include an impedance conversion line or a phase shifter.

According to an exemplary embodiment, the first attenuator or the second attenuator may include a plurality of resistance elements.

According to an aspect of another embodiment, there is provided a base station interface module included in a distributed antenna system, the base station interface module includes: a separator configured to separate a base station signal input from a base station and output first and second base station signals; a first attenuator configured to attenuate the first base station signal and to output the attenuated first base station signal to the distributed antenna system; a pre-compensator configured to compensate for at least one of an amplitude and a phase of the second base station signal based on a preset compensation value; and a second attenuator configured to attenuate the compensated second base station signal and to terminate the attenuated second base station signal.

According to an exemplary embodiment, the preset compensation value may include an amplitude compensation value for compensating for the amplitude of the second base station signal such that an amplitude of a second passive inter-modulation distortion (PIMD) component generated in the second attenuator and introduced into an input terminal of the separator is equal to an amplitude of a first PIMD component generated in the first attenuator and introduced into the input terminal of the separator.

According to an exemplary embodiment, the preset compensation value may include an amplitude compensation value for compensating for a phase of the first base station signal such that a phase of a second PIMD component generated in the second attenuator and introduced into an input terminal of the separator is out of phase with a phase of a first PIMD component generated in the first attenuator and introduced into the input terminal of the separator.

According to an exemplary embodiment, an amplitude of the first base station signal may be less than the amplitude of the second base station signal.

According to an exemplary embodiment, a phase of the first station signal and the phase of the second base station signal may have a phase difference of 0°, 90°, or 180°.

According to an exemplary embodiment, the separator may be a coupler or a divider.

According to an exemplary embodiment, the first attenuator or the second attenuator may include a plurality of resistance elements.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Various embodiments and features according to the inventive concept of the disclosure will be further described later below. It should be apparent that the teachings herein may be implemented in a wide variety of forms and any particular structure, function, or both, disclosed herein are merely exemplary, and not limiting. Based on the teachings herein, those of ordinary skill in the art will appreciate that aspects disclosed herein may be implemented independently of any other aspects, and two or more of these aspects may be combined in various ways. For example, a device or a method may be implemented by using any number of aspects set forth herein. Furthermore, the device or the method may be implemented with structures and functions of one or more of the aspects described herein, or may be implemented by using structures and functions of other aspects. For example, the method may be implemented as a part of instructions stored on a non-transitory computer-readable recording medium for execution on a system, a device, an apparatus and/or a processor, or a computer. Furthermore, one aspect may include at least one component of the claim.

Hereinafter, various embodiments of the disclosure will be described in detail in order.

Figure 1:
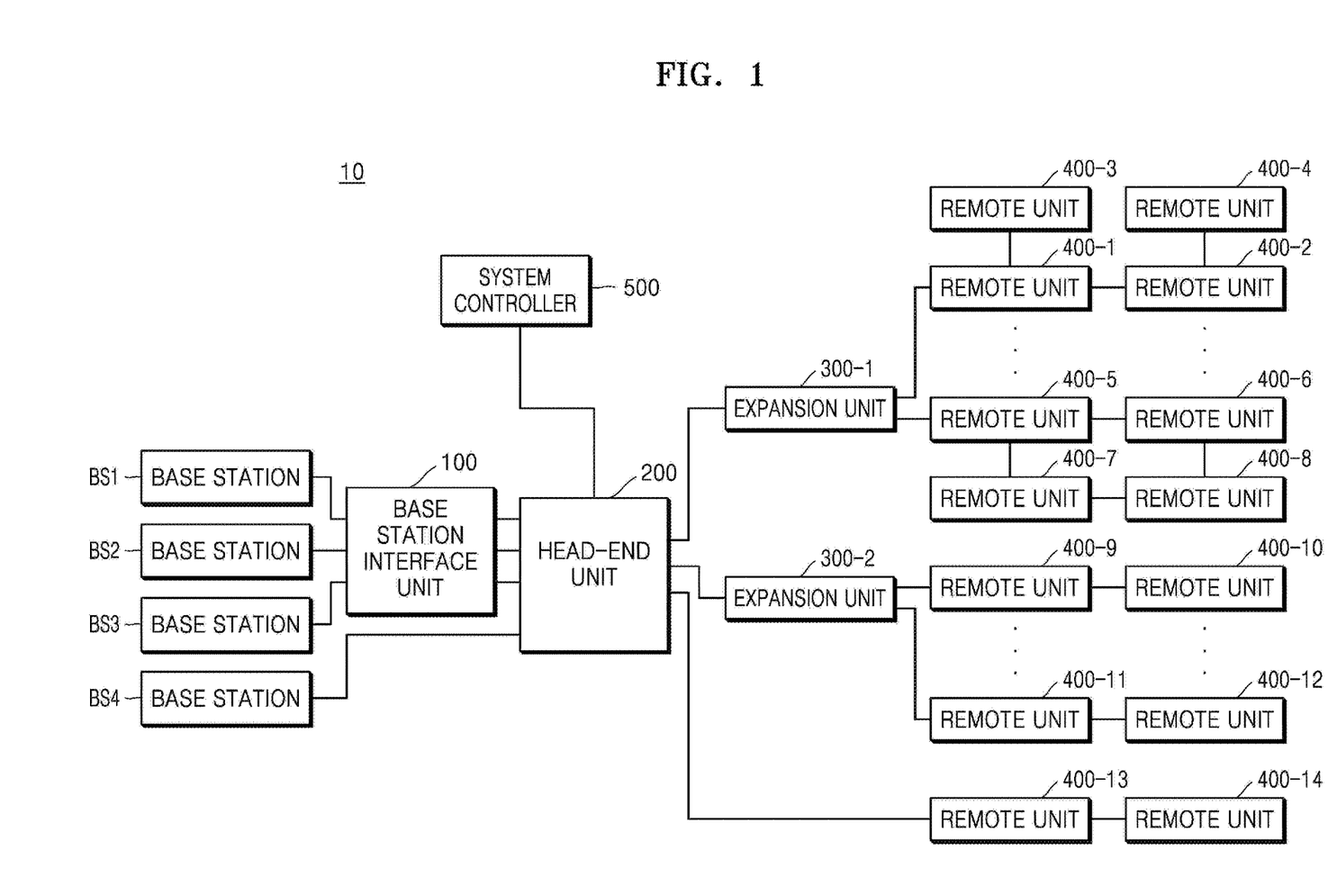
FIG. 1 is a conceptual block diagram of a distributed antenna system according to an embodiment.

FIG. 1 is a conceptual block diagram of a distributed antenna system according to an embodiment.

Referring to FIG. 1, a distributed antenna system (DAS) 10 may include a base station interface unit 100, a head-end unit 200, a plurality of expansion units 300-1 and 300-2, a plurality of remote units 400-1 to 400-14, and a system controller 500.

The base station interface unit 100 may be an interface between base stations BS1 to BS3 and the head-end unit 200. Here, the base stations BS1 to BS3 may include base station entities that provide a radio frequency (RF) signal (hereinafter referred to as a base station signal), and components of the base station (e.g., a remote radio head, etc.). The base stations BS1 to BS3 may be devices of the same or different providers. The base station signals provided by the base stations BS1 to BS3 may be signals of different frequency bands or signals of different sectors.

The base station interface unit 100 may be a device for matching between the base stations BS1 to BS3 and the head-end unit 200. For example, in a downlink path, the base station interface unit 100 may adjust a power level of high power base station signals received from the base stations BS1 to BS3 so as to have a low power level suitable for the head-end unit 200, and may transmit the base station signals having a low power level to the head-end unit 200. For example, in an uplink path, the base station interface unit 100 may adjust a power level of low power user device signals received from the head-end unit 200 to have a high power level suitable for the base stations BS1 to BS3, and may transmit the user device signals having a high power level to the base stations BS1 to BS3.

Detailed configuration and functions of the base station interface unit 100 for power control of the base station signals will be described in more detail with reference to FIGS. 2 to 5 below.

Meanwhile, the base station interface unit 100 may be referred to as a point of interface (POI).

The head-end unit 200 may receive power level-adjusted base station signals from the base station interface unit 100.

In addition, the head-end unit 200 may be in direct communication with a base station BS4 and may receive a base station signal directly from the base station BS4 without passing through the base station interface unit 100.

Here, the base station BS4 may be a base station component such as a base band unit, and a base station signal received from the base station BS4 may be a digitized RF signal. The digitized RF signal may include a data packet formatted according to a standardized telecommunication protocol. Non-limiting examples of the standardized telecommunication protocol may include a common public radio interface (CPRI), an Ethernet-based common public radio interface (eCRPI), an open radio equipment interface (ORI), or an open base station architecture initiative (OB-SAI) protocol.

As another example, the base station BS4 may be an IP backhaul device for a small cell and Wi-Fi backhaul service. The IP backhaul device may be an Internet gateway, a VPN gateway, or the like. Hereinafter, for convenience of description, an embodiment in which the base station BS4 is a base station device for providing a digitized RF signal will be described.

The head-end unit 200 may perform certain processing on the base station signals received from the base station interface unit 100 and the base station BS4.

The head-end unit 200 may digitally convert the base station signals received from the base station interface unit 100, and may perform resampling or the like on the base station signals received from the base station BS4.

The head-end unit 200 may generate downlink transmission frames by framing data streams generated as a result of the processing.

The head-end unit 200 may distribute the downlink transmission frames to the expansion units 300-1 and 300-2 and the remote units 400-1 to 400-14. In more detail, the head-end unit 200 may transmit the downlink transmission frames to remote units 400-1 to 400-12 via the expansion units 300-1 and 300-2, and may further transmit the downlink transmission frames to the remote units 400-13 and 400-14.

The head-end unit 200 may deframe uplink transmission frames received from the expansion units 300-1 and 300-2 and the remote units 400-1 to 400-14.

The head-end unit 200 may process data streams generated as a result of the deframing for the corresponding base station among the base stations BS1 to BS4 and then transmit the data streams through the interface unit 100 or directly to the base stations.

Meanwhile, although not shown in FIG. 1, the head-end unit 200 may be communicatively connected to at least one other head-end unit, and may transmit and receive downlink transmission frames and uplink transmission frames with the at least one other head-end unit.

The head-end unit 200 may distribute or redistribute the capacity for communication service. Here, the capacity may mean the capacity for each service. Also, the head-end unit 200 may distribute or redistribute the capacity for each service. Here, the service may mean a carrier, frequency band, sector, service for each provider.

The expansion units 300-1 and 300-2 may expand the connection capacity of the head-end unit 200. For example, the expansion unit 300-1 may be connected between the head-end unit 200 and remote units 400-1 to 400-8 to expand the connection capacity of the head-end unit 200. The expansion unit 300-2 may be connected between the head-end unit 200 and the remote units 400-9 to 400-12 to expand the connection capacity of the head-end unit 200.

The expansion units 300-1 and 300-2 may transmit and receive downlink transmission frames and uplink transmission frames between the head-end unit 200 and connected remote units among the remote units 400-1 to 400-12.

The expansion units 300-1 and 300-2 may convert the format of a transmitted signal in a signal transmission process. For example, the expansion units 300-1 and 300-2 may convert a digital signal received from the head-end unit 200 into an Ethernet format, and may transmit the data converted into the Ethernet format to the connected remote units among the remote units 400-1 to 400-12. The expansion units 300-1 and 300-2 may convert a signal of an Ethernet format received from the connected remote units among the remote units 400-1 to 400-12 into a digital signal and transmit the converted signal to the head-end unit 200.

The expansion units 300-1 and 300-2 may supply power to the connected remote units among the remote units 400-1 to 400-12. For example, the expansion units 300-1 and 300-2 may supply power to the connected remote units among the remote units 400-1 to 400-12 through a power of Ethernet (PoE). As another example, the expansion units 300-1 and 300-2 may operate as a power divider to distribute constant power supplied to each of the expansion units 300-1 and 300 to the connected remote units among the remote units 400-1 to 400-12.

The expansion units 300-1 and 300-2 may monitor a current for each of the connected remote units among the remote units 400-1 to 400-12, and may automatically turn off the power according to the monitoring.

The remote units 400-1 to 400-12 may be communicatively connected to the head-end unit 200 through a connected expansion unit among the expansion units 300-1 and 300-2. The remote units 400-13 and 400-14 may be in direct communication with the head-end unit 200.

The remote units 400-1 to 400-12 may deframe the downlink transmission frames received from the connected expansion unit among the expansion units 300-1 and 300-2 to generate data streams, and may recover the generated data streams to the original signals (e.g., an RF signal, a digitized RF signal). The remote units 400-1 to 400-12 may output the recovered signals in a form required by a user device or the like located in coverage.

The remote units 400-13 and 400-14 may deframe downlink transmission frames received from the head-end unit 200 to generate data streams, and may recover the generated data streams to the original signals. The remote units 400-13 and 400-14 may output the recovered signals in a form required by a user device or the like located in coverage.

The remote units 400-1 to 400-14 may perform certain processing on various wireless signals received from a user device or the like located in service coverage to generate an uplink transmission frame, and may transmit the uplink transmission frame to the corresponding unit among the expansion units 300-1 and 300-2.

The remote units 400-1 to 400-14 may be classified into high power and low power according to the output size.

Among the remote units 400-1 to 400-14, the remote units 400-1 to 400-8 may be referred to as low power radio nodes, and the remote units 400-9 to 400-14 may be referred to as high power radio nodes.

The remote units 400-1 to 400-8, which are low power radio nodes, may include an integrated antenna and may be connected to an external antenna through an external antenna port.

In addition, the remote units 400-1 to 400-8 may include or be connected to a plurality of directional antennas so as to transmit a signal to a specific area or a specific sector or receive a signal from a specific area or a specific sector. For example, the remote units 400-1 to 400-8 may include at least one sector antenna or may be connected to the sector antenna.

In addition, the remote units 400-1 to 400-8 may include or be connected to an omnidirectional antenna and a directional antenna. The remote units 400-1 to 400-8 may selectively operate only some of an integrated antenna and an external antenna.

Meanwhile, the remote units 400-9 to 400-14, which are high power wireless nodes, may be connected to the external antenna through the external antenna port. The external antenna may be any one of a directional antenna and an omnidirectional antenna.

Another remote unit (an add-on remote unit) may be connected to at least some of the remote units 400-1 to 400-14. This is to expand the capacity of the remote units 400-1 to 400-14 and may be selectively applied in multi input multi output (MIMO) service environment conditions.

The base station interface unit 100, the head-end unit 200, the expansion units 300-1 and 300-2, and the remote units 400-1 to 400-14 may be connected to each other through various transmission media. For example, the transmission medium may include an optical cable, a coaxial cable, an Ethernet cable, or the like.

The base station interface unit 100, the head-end unit 200, the expansion units 300-1 and 300-2, and the remote units 400-1 to 400-14 may be connected to each other in various topologies.

For example, as shown in FIG. 1, the head-end unit 200 may be connected to the expansion units 300-1 and 300-2 and the remote unit 400-13 in a star structure. The expansion units 300-1 and 300-2 may be connected to the corresponding remote units among the remote units 400-1 to 400-12 in a star structure. The remote units 400-1 and 400-2, the remote units 400-5, 400-6, and the like may be connected to each other in a cascade structure.

However, the disclosure is not limited thereto, and the base station interface unit 100, the head-end unit 200, the expansion units 300-1 and 300-2, and the remote units 400-1 to 400-14 may be connected to each other in various topologies such as a ring and a mesh, in addition to the above-described star and cascade hybrid structure.

In addition, the number of the base station interface unit 100, the head-end unit 200, the expansion units 300-1 and 300-2, and the remote units 400-1 to 400-14 may also be changed.

The base station interface unit 100, the head-end unit 200, the expansion units 300-1 and 300-2, and the remote units 400-1 to 400-14 may be implemented to support at least one of a frequency division duplex scheme and a time division duplex scheme.

A signal processing method between the base station interface unit 100, the head-end unit 200, the expansion units 300-1 and 300-2, and the remote units 400-1 to 400-14 may be variously configured according to a designer's or user's selection. Therefore, in the above-described embodiments, an analog processing method may be applied between some units in addition to a method of digitally processing and transmitting signals between each unit.

The system controller 500 may control and manage the DAS 10. For example, the system controller 500 may monitor and control the status and operation of the base station interface unit 100, the head-end unit 200, the expansion units 300-1 and 300-2, and the remote units 400-1 to 400-14 included in the DAS 10. The system controller 500 may be referred to as a network management system (NMS).

Figure 2:
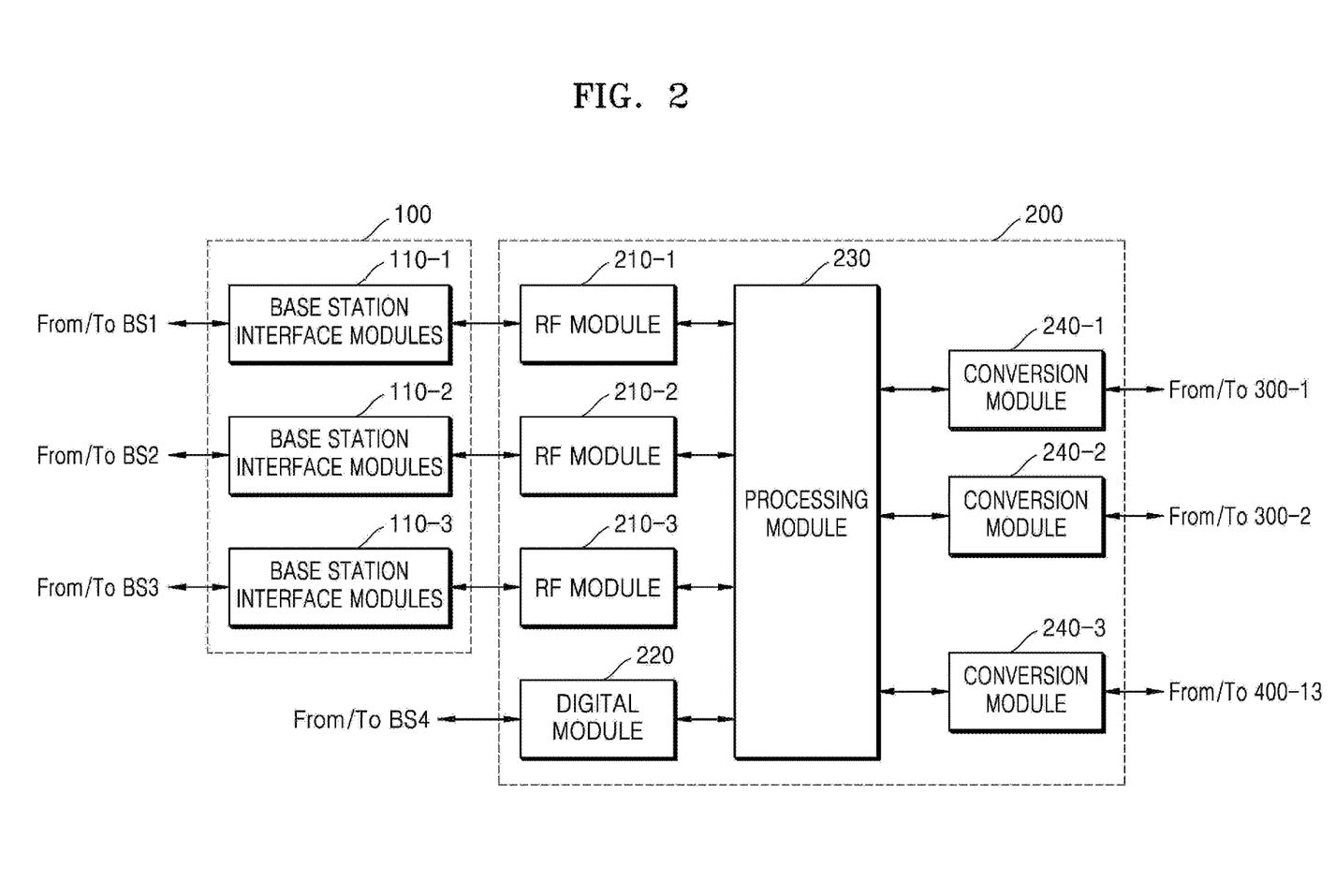
FIG. 2 is a block diagram of some components of a base station interface unit and a head-end unit in the distributed antenna system of FIG. 1.
Figure 3:
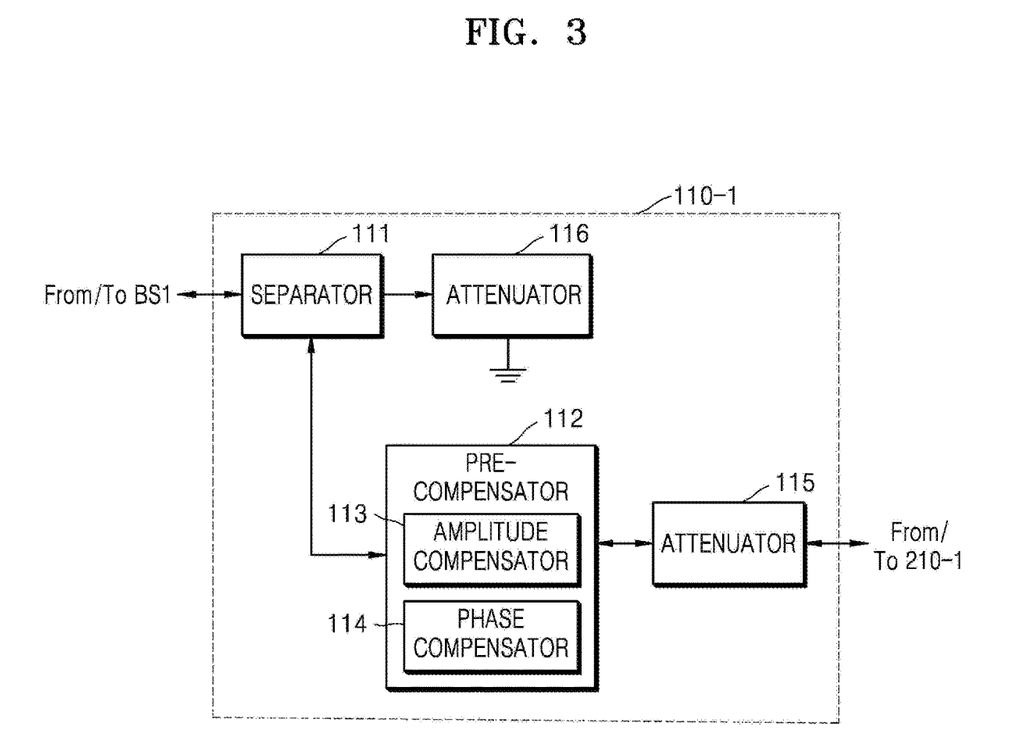
FIG. 3 is a block diagram of an embodiment of a base station interface module of FIG. 2.
Figure 4:
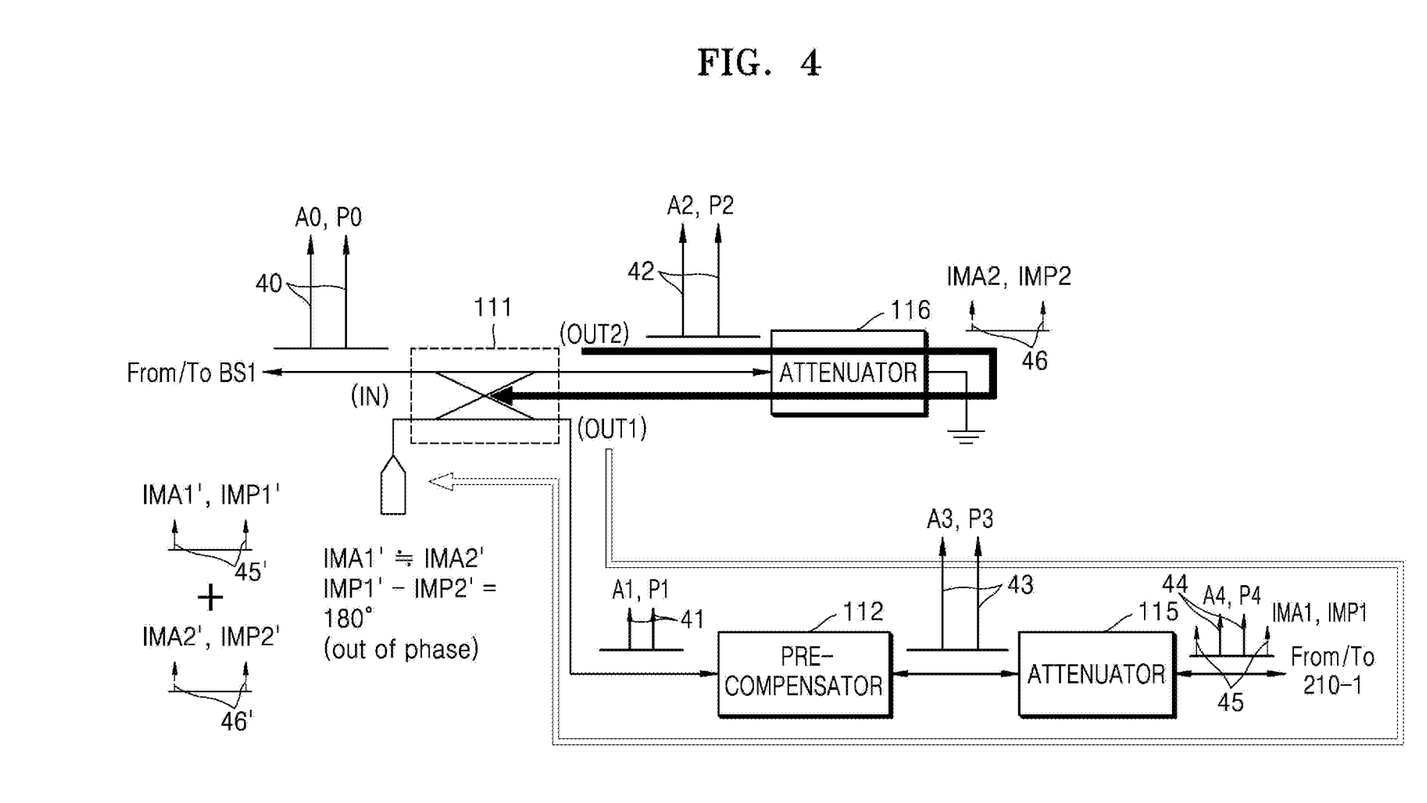
FIG. 4 is a view for explaining the operation of the base station interface module of FIG. 3.

FIG. 2 is a block diagram of some components of a base station interface unit and a head-end unit in the distributed antenna system of FIG. 1, FIG. 3 is a block diagram of an embodiment of a base station interface module of FIG. 2, and FIG. 4 is a view for explaining the operation of the base station interface module of FIG. 3.

First, referring to FIGS. 2 and 3, the base station interface unit 100 may include base station interface modules 110-1 to 110-3.

The base station interface modules 110-1 to 110-3 may be communicatively connected to the corresponding base stations among the base stations BS1 to BS3, respectively.

Meanwhile, for convenience of description, FIG. 3 shows only the base station interface module 110-1, but the base station interface modules 110-2 and 110-3 may have substantially the same configuration as the base station interface module 110-1. Hereinafter, the base station interface module 110-1 will be mainly described.

The base station interface module 110-1 may include a separator 111, a pre-compensator 112, a first attenuator 115, and a second attenuator 116.

The separator 111 may separate a base station signal input from the base station BS1 and output first and second base station signals.

The separator 111 may include a coupler having an input terminal and at least two output terminals, or a power divider. The separator 111 may output the first and second base station signals by dividing the power of a base station signal of high power through a power distribution function of the coupler or the power divider. For example, the coupler may be a 90° hybrid coupler or a ring hybrid coupler. For example, the power divider may be a Wilkinson divider. However, the inventive concept is not limited thereto, and the coupler and power divider may be a different type of coupler or power divider than illustrated.

The first and second base station signals may have different amplitudes. For example, the amplitude of the first base station signal may be less than the amplitude of the second base station signal. A ratio of the amplitude of the first base station signal to the amplitude of the second base station signal may be determined according to a power distribution ratio of the separator 111.

In addition, the first and second base station signals may have the same or different phases. For example, the first and second base station signals may have a phase difference of 0°, 90°, or 180°.

For example, when the separator 111 is configured as a Wilkinson divider, the first and second base station signals may have a phase difference of 0°, that is, an in-phase relationship.

As another example, when the separator 111 is configured with a 90° hybrid coupler, the first and second base station signals may have a phase difference of 90°.

As another example, when the separator 111 is a ring hybrid coupler, the first and second base station signals may have a phase difference of 180°.

The pre-compensator 112 may be between an output terminal for outputting the first base station signal transmitted to the head-end unit 200, among the output terminals of the separator 111, and the first attenuator 115.

The pre-compensator 112 may compensate for at least one of an amplitude and a phase of the first base station signal based on a preset compensation value. The pre-compensator 112 performs pre-compensation on the first base station signal such that, when a first passive inter-modulation distortion (PIMD) component generated in the first attenuator 115 and a second PIMD component generated in the second attenuator 116 are introduced into an input terminal of the separator 111, the amplitude of the first PIMD component and the amplitude of the second PIMD component are out of phase with each other and canceled or attenuated to the amplitude that does not affect the service of the DAS 10.

The preset compensation value may include an amplitude compensation value for compensating for the amplitude of the first base station signal such that the amplitude of the first PIMD component and the amplitude of the second PIMD component are substantially equal to each other. According to an embodiment, the amplitude compensation value may include an amplitude compensation value for compensating for the amplitude of the first base station signal such that a difference between the amplitude of the first PIMD component and the amplitude of the second PIMD component is within a range that does not affect the service of the DAS 10.

Also, the preset compensation value may include a phase compensation value for compensating for the phase of the first base station signal such that a phase of the first PIMD component and a phase of the second PIMD component have an out-of-phase relationship.

For example, when the separator 111 is configured as a Wilkinson divider and the amplitude of the first base station signal is less than the amplitude of the second base station signal, the first PIMD component and the second PIMD component may be in-phase with each other and have different amplitudes at the input terminal of the separator 111. In this case, the preset compensation value may include the amplitude compensation value for compensating for the amplitude of the first base station signal to a certain value and a phase compensation value for compensating for the phase of the first base station signal to 90°.

As another example, when the separator 111 is configured as a 90° hybrid coupler and the amplitude of the first base station signal is less than the amplitude of the second base station signal, the first PIMD component and the second PIMD component may be out of phase with each other and have different amplitudes at the input terminal of the separator 111. In this case, the preset compensation value may include only an amplitude compensation value for compensating for the amplitude of the first base station signal to a certain value.

As another example, when the separator 111 is configured as a ring hybrid coupler and the amplitude of the first base station signal is less than the amplitude of the second base station signal, the first PIMD component and the second PIMD component may be in-phase with each other and have different amplitudes at the input terminal of the separator 111. In this case, the preset compensation value may include an amplitude compensation value for compensating for the amplitude of the first base station signal to a certain amplitude and a phase compensation value for compensating for the phase of the first base station signal to 90°.

The pre-compensator 112 may include at least one of an amplitude compensator 113 and a phase compensator 114.

The amplitude compensator 113 may be a device for compensating for the amplitude of the above-described first base station signal. The amplitude compensator 113 may include an attenuator or an amplifier. Here, the attenuator may include an attenuator having a fixed amount of attenuation and a variable attenuator having a variable amount of attenuation. Similarly, the amplifier may include an amplifier having a fixed amplification gain and a variable gain amplifier having a variable amplification gain.

The phase compensator 114 may be a device for compensating for the phase of the above-described first base station signal. The phase compensator 114 may include an impedance conversion line or a phase shifter. According to an embodiment, the impedance conversion line may be a line having a 90° phase value. The phase shifter may be implemented by a combination of a resistor, an inductor, a capacitor, and a filter, but is not limited thereto.

The first attenuator 115 may attenuate the compensated first base station signal output from the pre-compensator 112. For example, the first attenuator 115 may be a relatively simple attenuator such as a pie type attenuator, a T type attenuator, or the like composed of only a plurality of resistance elements.

The first attenuator 115 may attenuate the compensated first base station signal to have a power level suitable for processing in the DAS 10. For example, the first attenuator 115 may attenuate the compensated first base station signal to be suitable for processing in an RF module 210-1 of the head-end unit 200.

The first attenuator 115 may output the attenuated first base station signal to the DAS 10, more specifically, the RF module 210-1 of the head-end unit 200.

The second attenuator 116 may attenuate the second base station signal output from the separator 111. For example, the second attenuator 116 may also be a relatively simple attenuator such as a pie type attenuator, a T type attenuator, or the like composed of only a plurality of resistance elements.

The second attenuator 116 may attenuate the second base station signal and terminate the same to the ground.

The structures, attenuation values, and the like of the first and second attenuators 115 and 116 may be the same, but the disclosure is not limited thereto. Depending on the embodiment, at least some of the structures, attenuation values, and the like of the first and second attenuators may be different.

The operation of the base station interface module 110-1 will be described with further reference to FIG. 4. FIG. 4 shows an embodiment where the separator 111 is configured as a Wilkinson divider. It may be fully understood from FIG. 4 and the following description of the present application that the separator 111 is implemented with other types of dividers and couplers.

Further referring to FIG. 4, a high power base station signal 40 of the base station BS1 may be input to an input terminal IN of the separator 111. The base station signal 40 may be an RF signal having an amplitude A0 and a phase P0.

The separator 111 may distribute the power of the base station signal 40 to output a first base station signal 41 to a first output terminal OUT1, and output a second base station signal 42 to a second output terminal OUT2. The first base station signal 41 may have an amplitude A1 and a phase P1, and the second base station signal 42 may have an amplitude A2 and a phase P2. The amplitude A1 of the first base station signal 41 may be less than the amplitude A2 of the second base station signal 42. The phase P1 of the first base station signal 41 and the phase P2 of the second base station signal 42 may have a phase value of 90° based on the input terminal IN of the separator 111, respectively, and may be in-phase with each other.

The pre-compensator 112 may output a compensated first base station signal 43 by compensating for the amplitude and phase of the first base station signal 41 based on a preset compensation value. The compensated first base station signal 43 may have an amplitude A3 and a phase P3. The amplitude A3 of the compensated first base station signal 43 may correspond to or be greater than the amplitude A2 of the second base station signal 42. The phase P3 of the compensated first base station signal 43 may have a phase difference of 90° with the phase P2 of the second base station signal 42.

The first attenuator 115 may attenuate the compensated first base station signal 43 to output an attenuated first base station signal 44, where a first PIMD component 45 may be generated. The attenuated first base station signal 44 may have an amplitude A4 and a phase P4. The amplitude A4 of the attenuated first base station signal 44 may have a level suitable for processing in the RF module 210-1 of the head-end unit 200. However, the disclosure is not limited thereto, and the amplitude A4 of the attenuated first base station signal 44 may have a higher or lower level within a certain range based on a level suitable for processing in the RF module 210-1 of the head-end unit 200. The phase P4 of the attenuated first base station signal 44 may have a phase value of 180° based on the input terminal IN of the separator 111. The first PIMD component 45 may have an amplitude IMA1 and a phase IMP1.

The first PIMD component 45 may be mixed with a user device signal (not shown) received from the RF module 210-1 of the head-end unit 200 and introduced into the input terminal IN of the separator 111. A first PIMD component 45′ introduced into the input terminal IN of the separator 111 may have an amplitude IMA1′ and a phase IMP1′. The amplitude IMA1′ may be substantially the same as the amplitude IMA1, and the phase IMP1′ may have a phase difference of 90° with the phase IMP1.

The second attenuator 116 may attenuate and terminate the second base station signal 42, where a second PIMD component 46 may be generated. The second PIMD component 46 may have an amplitude IMA2 and a phase IMP2.

The second PIMD component 46 may be reflected by the ground and introduced into the input terminal IN of the separator 111. A second PIMD component 46' introduced into the input terminal IN of the separator 111 may have an amplitude IMA2' and a phase IMP2'. The amplitude IMA2' may be substantially the same as the amplitude IMA2, and the phase IMP2' may have a phase difference of 90° with the phase IMP2.

The first PIMD component 45' and the second PIMD component 46' introduced into the input terminal of the separator 111 may be mixed. The amplitude IMA1' of the first PIMD component 45 and the amplitude IMA2' of the second PIMD component 46 may be substantially the same. The phase IMP1' of the first PIMD component 45 and the phase IMP2' of the second PIMD component 46 may have a phase difference of 180°, that is, an out-of-phase relationship. Accordingly, the first PIMD component 45' and the second PIMD component 46' may be canceled, and a spurious interference due to a PIMD to user device signals transmitted to the base station BS1 through the input terminal of the separator 111 is blocked, communication failure between the base station BS1 and a user device may be prevented.

The base station interface module 110-1 according to an embodiment does not use an expensive and large high power attenuator or a winding resistor type attenuator when lowering a power level of a high power base station signal and transmitting the high power base station signal to the DAS 10, and uses a cheap and small power coupler (or a power divider) or simple attenuators. Also, the base station interface module 110-1, in order to remove PIMD components generated in the attenuators, disposes a pre-compensator that pre-compensates at least one of amplitude and phase between one output terminal of a power coupler (or a power divider) and an attenuator and effectively removes the PIMD components.

Accordingly, the base station interface module 110-1 according to an embodiment may enhance price competitiveness of the DAS 10 by reducing the manufacturing cost.

In addition, the base station interface module 110-1 may be reduced in size, thereby increasing the ease of design of the DAS 10 and miniaturizing the equipment.

In addition, the base station interface module 110-1 may effectively prevent communication failures due to PIMD, thereby improving service reliability of the DAS 10.

Referring again to FIG. 2, the head-end unit 200 may include RF modules 210-1 to 210-3, a digital module 220, a processing module 230, and conversion modules 240-1 to 240-3.

The RF modules 210-1 to 210-3 may be communicatively connected to corresponding base station interface modules of the base station interface modules 110-1 to 110-3, respectively, and the digital module 220 may be communicatively connected to the base station BS4.

The RF modules 210-1 to 210-3 may digitize RF signals (e.g., base station signals with an adjusted power level through power distribution, pre-compensation, and attenuation processing) received from the base station interface modules 110-1 to 110-3. The RF modules 210-1 to 210-3 may transmit data streams generated as a result of the digitization to the processing module 230.

The digital module 220 may perform processing such as resampling on the digitized RF signals and then transmit the data streams to the processing module 230.

The processing module 230 may frame the data streams to generate a downlink transmission frame, and may distribute the downlink transmission frame to the transformation modules 240-1 to 240-3.

Each of the conversion modules 240-1 to 240-3 may convert the downlink transmission frame into a format suitable for a transmission medium between the head-end unit 200, the extension units 300-1 and 300-2, and the remote unit 400-13 and may transmit the downlink transmission frame to each unit.

In the case of an uplink path, since each module performs signal processing opposite to the signal processing operations in the downlink path described above, a detailed description thereof will not be given herein.

Figure 5:
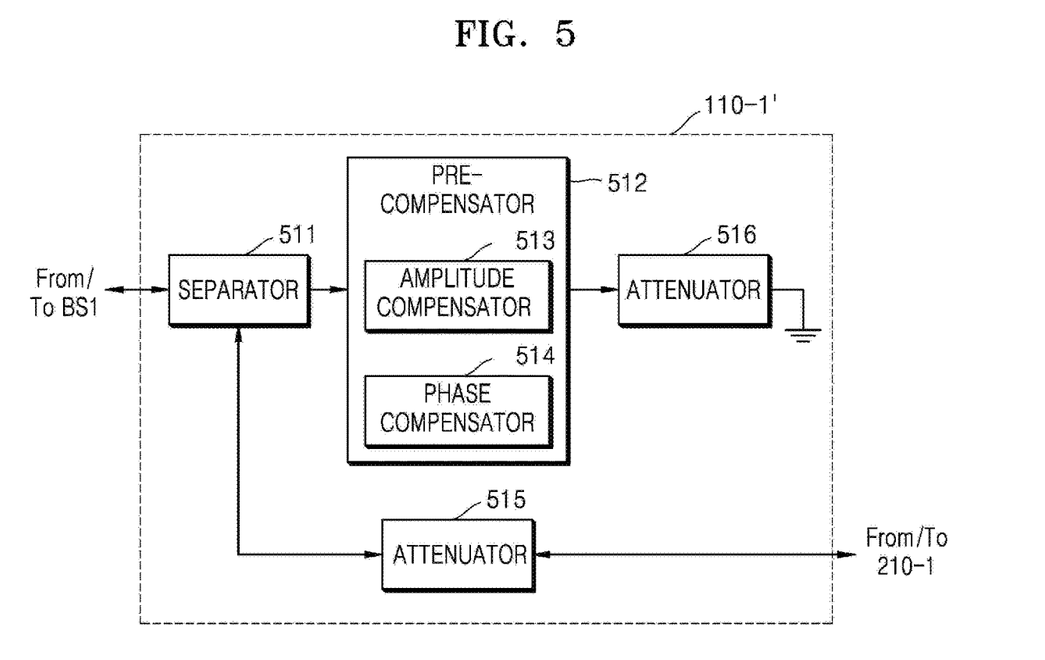
FIG. 5 is a block diagram of another embodiment of a base station interface module of FIG. 2.

FIG. 5 is a block diagram of another embodiment of the base station interface module of FIG. 2. In the description of FIG. 5, the same or corresponding reference numerals as those in FIG. 3 denote the same or corresponding elements, and therefore, repeated descriptions thereof will not be given herein. A pre-compensator 512 not shown in FIG. 3 will be mainly described.

Referring to FIGS. 2 and 5, a base station interface module 110-1' may include a separator 511, a first attenuator 515, a pre-compensator 512, and a second attenuator 516.

The separator 511 may separate a base station signal input from the base station BS1 and output first and second base station signals.

The first and second base station signals may have different amplitudes. For example, the amplitude of the first base station signal may be less than the amplitude of the second base station signal.

In addition, the first and second base station signals may have the same or different phases. For example, the first and second base station signals may have a phase difference of 0°, 90°, or 180°.

In the base station interface module 110-1', the pre-compensator 512 may be between an output terminal for outputting the second base station signal, which is a termination target, among output terminals of the separator 511 and the second attenuator 516.

The pre-compensator 512 may compensate for at least one of the amplitude and the phase of the second base station signal based on a preset compensation value. The pre-compensator 512 performs pre-compensation on the second base station signal such that, when a second PIMD component generated in the second attenuator 516 and a first PIMD component generated in the first attenuator 515 are introduced into an input terminal of the separator 511, the first PIMD component and the second PIMD component are out of phase with each other and canceled or attenuated to the amplitude that does not affect the service of the DAS 10.

The preset compensation value may include an amplitude compensation value for compensating for the amplitude of the second base station signal such that the amplitude of the second PIMD component and the amplitude of the first PIMD component are substantially equal to each other. According to an embodiment, the amplitude compensation value may include an amplitude compensation value for compensating for the amplitude of the second base station signal such that a difference between the amplitude of the second PIMD component and the amplitude of the first PIMD component is within a range that does not affect the service of the DAS 10.

Also, the preset compensation value may include a phase compensation value for compensating for the phase of the second base station signal such that the phase of the second PIMD component and the phase of the first PIMD component have an out-of-phase relationship.

The pre-compensator 112 of the base station interface module 110-1 described with reference to FIG. 3 performs pre-compensation for the first base station signal having a relatively small amplitude, and thus performs pre-compensation for increasing the amplitude of the first base station signal.

Meanwhile, the pre-compensator 512 of the base station interface module 110-1' described with reference to FIG. 5 performs pre-compensation for the second base station signal having a relatively great amplitude, and thus performs pre-compensation for reducing the amplitude of the first base station signal.

The second attenuator 516 may attenuate the compensated second base station signal output from the pre-compensator 512 and terminate the attenuated second base station signal to the ground.

The first attenuator 115 may attenuate the first base station signal output from the separator 511 and may output the attenuated first base station signal to the DAS 10, more specifically, the RF module 210-1 of the head-end unit 200.

Meanwhile, although not shown, depending on the embodiment, a base station interface module may be implemented in a form in which arrangements and operation concepts of the pre-compensators 112 and 512 described with reference to FIGS. 3 and 5 are mixed. In other words, the base station interface modules 110-1 and 110-1' may be implemented in a form in which pre-compensators are disposed on the both output terminals of the separators 111 and 511, respectively.

According to embodiments of the disclosure, a base station interface module may reduce the manufacturing cost of a distributed antenna system and enable miniaturization while effectively preventing degradation in service performance due to passive inter-modulation distortion and a communication failure.

Effects obtainable by the base station interface module and a distributed antenna system having the base station interface module according to the inventive concept of the present disclosure are not limited to the effect(s) described above, but other effect(s) not described herein may be clearly understood by one of ordinary skilled in the art from the above descriptions.

The various illustrative logic blocks, components, or circuits described in connection with the disclosure may be implemented or performed by a general-purpose processor designed to perform the functions disclosed herein, a digital signal processor (DSP), an ASIC, a field-programmable gate array (FPGA) or other programmable logic device (PLD), a discrete gate or transistor logic device, discrete hardware components, or any combination thereof. The general-purpose processor may be a microprocessor, but in the alternative, the processor may be any commercially available processor, controller, microcontroller, or state machine. The processor may also be implemented in a combination of computing devices, for example, a combination of the DSP and the microprocessor, a plurality of microprocessors, one or more microprocessors in conjunction with a DSP core, or any other such configuration.

Numerous modifications and adaptations will be readily apparent to one of ordinary skill in the art without departing from the spirit and scope of the disclosure.

In this regard, the present embodiments may have different forms and should not be construed as being limited to the descriptions set forth herein.

While the disclosure has been particularly shown and described with reference to embodiments thereof, it will be understood that various changes in form and details may be made therein without departing from the spirit and scope of the following claims.

What is claimed is:

1. A base station interface module included in a distributed antenna system, the base station interface module comprising:
a separator configured to separate a base station signal input from a base station and output first and second base station signals;
a pre-compensator configured to compensate for at least one of an amplitude and a phase of the first base station signal based on a preset compensation value;
a first attenuator configured to attenuate the compensated first base station signal and to output the attenuated first base station signal to the distributed antenna system; and
a second attenuator configured to attenuate the second base station signal and to terminate the attenuated second base station signal.

2. The base station interface module of claim 1, wherein the preset compensation value comprises:
an amplitude compensation value for compensating for an amplitude of the first base station signal such that an amplitude of a first passive inter-modulation distortion (PIMD) component generated in the first attenuator and introduced into an input terminal of the separator is equal to an amplitude of a second PIMD component generated in the second attenuator and introduced into the input terminal of the separator.

3. The base station interface module of claim 1, wherein the preset compensation value comprises:
an amplitude compensation value for compensating for the phase of the first base station signal such that a phase of a first PIMD component generated in the first attenuator and introduced into an input terminal of the separator is out of phase with the phase of a second PIMD component generated in the second attenuator and introduced into the input terminal of the separator.

4. The base station interface module of claim 1, wherein the amplitude of the first base station signal is less than an amplitude of the second base station signal.

5. The base station interface module of claim 1, wherein the phase of the first station signal and a phase of the second base station signal have a phase difference of 0°, 90°, or 180°.

6. The base station interface module of claim 1, wherein the separator is a coupler or a divider.

7. The base station interface module of claim 1, wherein the pre-compensator comprises an attenuator or an amplifier.

8. The base station interface module of claim 1, wherein the pre-compensator comprises an impedance conversion line or a phase shifter.

9. The base station interface module of claim 1, wherein the first attenuator or the second attenuator comprises a plurality of resistance elements.

10. A base station interface module included in a distributed antenna system, the base station interface module comprising:
a separator configured to separate a base station signal input from a base station and output first and second base station signals;
a first attenuator configured to attenuate the first base station signal and to output the attenuated first base station signal to the distributed antenna system;
a pre-compensator configured to compensate for at least one of an amplitude and a phase of the second base station signal based on a preset compensation value; and a second attenuator configured to attenuate the compensated second base station signal and to terminate the attenuated second base station signal.

11. The base station interface module of claim 10, wherein the preset compensation value comprises:
an amplitude compensation value for compensating for the amplitude of the second base station signal such that an amplitude of a second passive inter-modulation distortion (PIMD) component generated in the second attenuator and introduced into an input terminal of the separator is equal to an amplitude of a first PIMD component generated in the first attenuator and introduced into the input terminal of the separator.

12. The base station interface module of claim 10, wherein the preset compensation value comprises:
an amplitude compensation value for compensating for a phase of the first base station signal such that a phase of a second PIMD component generated in the second attenuator and introduced into an input terminal of the separator is out of phase with a phase of a first PIMD component generated in the first attenuator and introduced into the input terminal of the separator.

13. The base station interface module of claim 10, wherein an amplitude of the first base station signal is less than the amplitude of the second base station signal.

14. The base station interface module of claim 10, wherein a phase of the first station signal and the phase of the second base station signal have a phase difference of 0°, 90°, or 180°.

15. The base station interface module of claim 10, wherein the separator is a coupler or a divider.

16. The base station interface module of claim 10, wherein the first attenuator or the second attenuator comprises a plurality of resistance elements.

* * * * *